United States Patent [19]

Witt et al.

[11] 4,325,211

[45] Apr. 20, 1982

[54] FLOATING DECK FOR RIDER MOWER

[75] Inventors: Robert H. Witt, Bloomington; Walter J. Petersen, Eden Prairie, both of Minn.

[73] Assignee: The Toro Company, Minneapolis, Minn.

[21] Appl. No.: 183,293

[22] Filed: Sep. 2, 1980

[51] Int. Cl.³ ............................................. A01D 35/26
[52] U.S. Cl. .............................. 56/15.8; 56/DIG. 22
[58] Field of Search .................... 56/15.2, 15.7, 15.8, 56/DIG. 22; 280/6 R, 43, 43.24

[56] References Cited

U.S. PATENT DOCUMENTS

| | | | |
|---|---|---|---|
| 3,169,358 | 2/1965 | Ertsgaard et al. | 56/DIG. 22 |
| 3,461,654 | 8/1969 | Plamper | 56/15.8 |
| 3,611,682 | 10/1971 | Isaacson et al. | 56/DIG. 22 |
| 3,706,186 | 12/1972 | Hurlbert et al. | 56/15.8 |
| 4,120,136 | 10/1978 | Rose | 56/DIG. 22 |

Primary Examiner—Robert A. Hafer
Attorney, Agent, or Firm—James W. Miller

[57] ABSTRACT

A riding mower (2) includes a cutting unit (6) suspended from a traction unit (4). Cutting unit (6) is suspended from a forwardly extending frame (8) by four suspension units (40-43). Each suspension unit includes an upwardly opening saddle member (44) in which a pin (51) carried on cutting unit (6) is received. At least some of the pins (51) are longitudinally constrained in the saddle members (44) to longitudinally couple cutting unit (6) to frame (8). This allows cutting unit (6) to move upwardly relative to frame (8) at each of the suspension units to allow the cutting unit (6) to tilt or float relative to frame (8).

8 Claims, 4 Drawing Figures

FLOATING DECK FOR RIDER MOWER

TECHNICAL FIELD

This invention relates to a vegetation cutting apparatus, such as a riding mower, having a cutting unit or deck. More particularly, this invention relates to an improved means for suspending the cutting unit from the riding mower for side-to-side tilting of the cutting unit. This invention could be used on any vegetation cutting apparatus where the cutting unit should float relative to its supporting framework to avoid scalping the ground even when the ground contour changes.

BACKGROUND OF THE INVENTION

Self-propelled riding mowers are well-known. They typically comprise a cutting unit secured to the front of a traction unit. The operator sits on and is carried by the traction unit. The cutting unit usually includes one or more rigid steel blades rotated in horizontal cutting planes to sever grass or other vegetation at a pre-determined height above the ground. Such riding mowers are often known as rotary mowers since the blades revolve in a rotary fashion in the cutting unit. The assignee for the present application manufactures two such products which are typical of this class of riding mowers. These products are the Groundsmaster 52 ® and Groundsmaster 72 ® riding mowers.

The Groundsmaster 52 ® riding mower includes a frame that extends forwardly from the traction unit. This frame includes two lift arms. The lift arms can be used to raise or lower the frame between an upper transport position and a lower cutting position. The cutting unit is rigidly secured to the frame. The frame includes two caster wheels located in front of the cutting unit. The caster wheels roll over the ground surface to sense the ground contour. The height of cut is changed by changing the height of the caster wheels relative to the frame.

One disadvantage with the conventional Groundsmaster 52 ® riding mower has been the rigid attachment of the cutting unit to the frame. This does not allow a side-to-side floating action of the cutting unit relative to the frame. Thus, a bump in the ground surface which occurs between the caster wheels, and which does not therefore cause the caster wheels to change their elevation, will usually be scalped by the cutting unit. By scalped it is meant that the rotary blades of the cutting unit either cut the vegetation too closely to the ground or in some cases come in contact with the ground itself. This inability of the cutting unit to float freely from side-to-side is disadvantageous.

Various techniques have been used for allowing a cutting unit to float from side-to-side. One of these techniques is used on the Groundsmaster 72 ® Toro riding mower. In this product, the two lift arms are attached directly to the cutting unit using universal joint connections. Each lift arm is also independently movable at its point of attachment to the traction unit. The cutting unit is provided with four caster wheels which roll on the ground surface. The use of universal joints at the connection between the lift arms and the cutting unit allows the cutting unit to tilt side-to-side relative to the traction unit and the lift arms. Such a cutting unit has superior anti-scalping properties.

The universal joint solution to the problem of giving a cutting unit a side-to-side tilt is somewhat expensive. Thus, it may be somewhat uneconomic for a product of smaller size, such as the Groundsmaster 52 ®. It would be advantageous to have a simpler solution for this problem, which would be less expensive, but which would give equally good results.

SUMMARY OF THE INVENTION

This invention relates to a riding mower or any vegetation cutting apparatus having a cutting unit supported by a base unit or traction unit. One aspect of this invention is such an apparatus where the cutting unit has good overall floating or tilting relative to its supporting framework without being unduly complex or expensive.

This invention relates to a self-propelled riding mower which comprises a traction unit suited for movement over the ground. A cutting unit having means for cutting vegetation is supported on the traction unit by a mounting means. The mounting means comprises a frame means extending outwardly from the traction unit. Means is provided for suspending the cutting unit from the frame means at four suspension points located approximately in the same plane with the cutting unit free to move upwardly at each of the suspension points independently of the frame to allow the cutting unit to tilt relative to the frame.

Another aspect of this invention is a vegetation cutting apparatus having a base unit which is movable over the ground. A cutting unit having means for cutting vegetation is mounted on the base unit. The mounting means comprises means for suspending the cutting unit from the base unit on at least two suspension points with the cutting unit free to move upwardly at each of the suspension points independently of the base unit to allow the cutting unit to tilt side-to-side relative to the base unit. The suspending means comprises a suspension unit at each of the suspension points. The suspension unit comprises a suspension member carried on the cutting unit which is received in an elongated vertical slot on the base unit to allow upward vertical movement of the cutting unit relative to the base unit. At least one of the suspension members on the base unit is longitudinally secured to the vertical slot on the base unit to couple the cutting unit to the base unit for movement therewith.

BRIEF DESCRIPTION OF THE DRAWINGS

The present invention will be described more fully hereafter in the Detailed Description, when taken in conjunction with the following drawings, in which like referenced numerals refer to like elements throughout.

DETAILED DESCRIPTION

Figure 1:
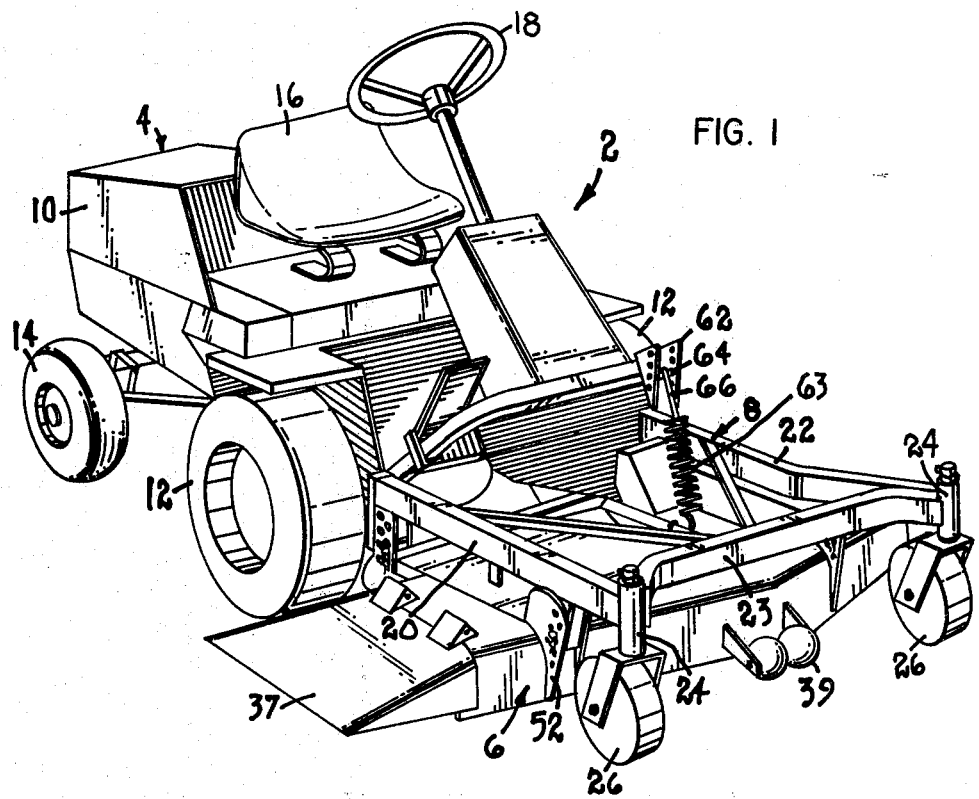
FIG. 1 is a perspective view of an improved self-propelled riding mower according to this invention having a cutting unit suspended forwardly of a traction unit.

Referring first to FIG. 1, an improved self-propelled riding mower according to this present invention is generally illustrated as 2. Mower 2 is preferably of the type embodied in the Groundsmaster 52 ® and Groundsmaster 72 ® riding mowers marketed by the assignee of the present invention, The Toro Company. In other words, mower 2 includes a traction unit 4 which might otherwise be referred to as a base unit. A cutting unit 6 is mounted on and extends forwardly from traction unit 4. A frame 8 is attached to traction unit 4 and overlies cutting unit 6 to support cutting unit 6. This invention relates particularly to an improved means for suspending cutting unit 6 from frame 8 for a free floating or tilting of cutting unit 6 relative to frame 8.

THE TRACTION UNIT

Traction unit 4 is any conventional traction unit having a body 10 that carries a prime mover (not shown), such as an internal combustion engine, for moving body 10 over a ground surface. Body 10 is supported by two front traction wheels 12 drivingly coupled to the prime mover and by two steerable rear wheels 14. Body 10 includes a seat 16 on which the operator of mower 2 sits and a steering wheel 18 which the operator uses to control the direction of movement of traction unit 4. Steering wheel 18 is coupled to rear wheels 14 through any standard linkage.

While a self-propelled traction unit 4 has been disclosed herein as the base unit on which cutting unit 6 is mounted, this is not strictly necessary to the present invention. For example, the improved means for suspending cutting unit 6 from traction unit 4 could be used wherever a cutting unit 6 of the type disclosed herein is employed, whether or not traction unit 4 is self-propelled or carries an operator. For example, traction unit 4 to which cutting unit 6 is attached could comprise nothing more than a wheeled carriage towed behind some other vehicle.

THE FRAME

Figure 2:
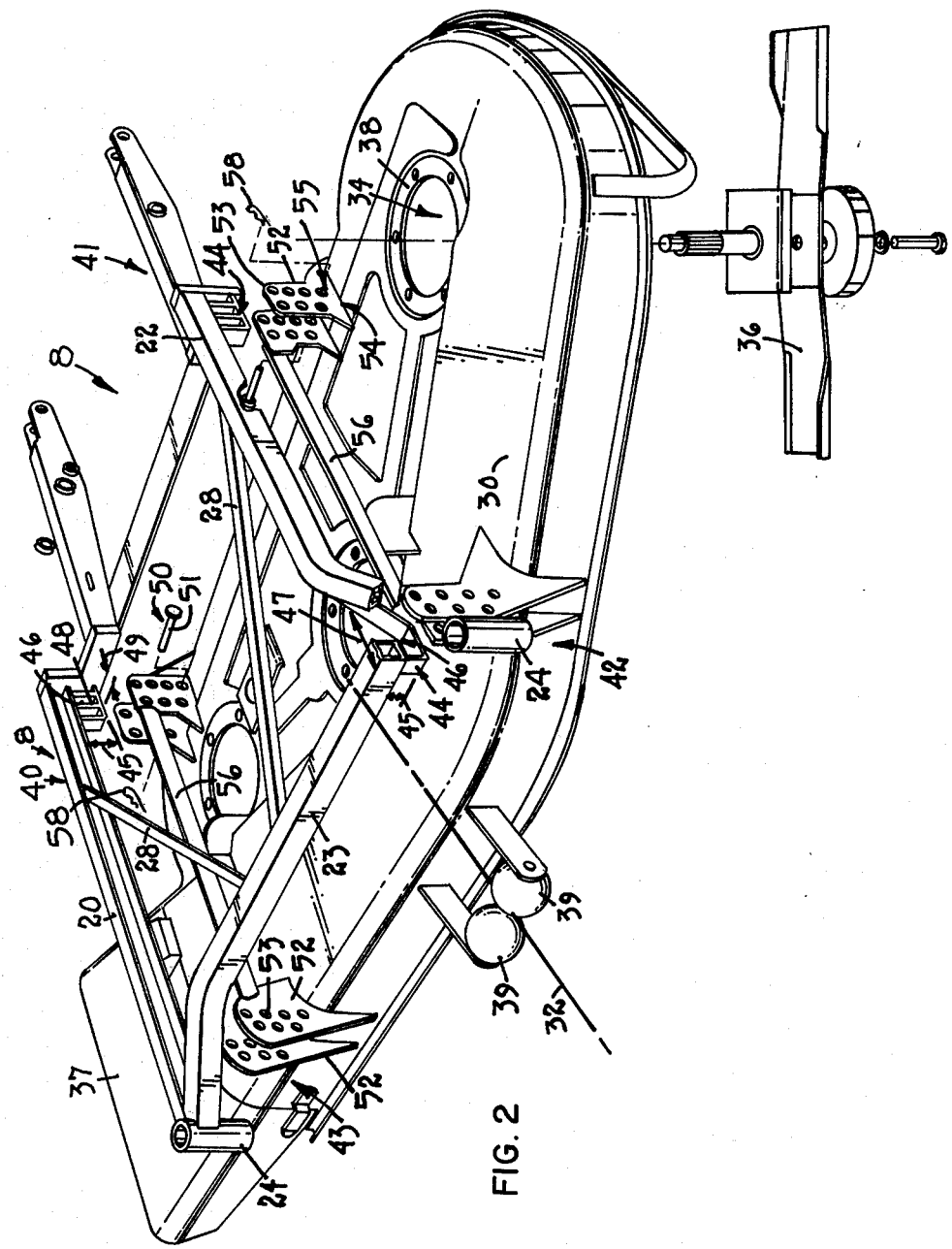
FIG. 2 is a perspective view of the cutting unit of the riding mower shown in FIG. 1, particularly illustrating the means for suspending the cutting unit from the frame of the traction unit.

Frame 8 is shown particularly in FIG. 2. Frame 8 comprises two forwardly extending lift arms 20 and 22 joined together at the front by a front bar 23. Lift arms 20 and 22 are connected at their rear ends to a suitable lift mechanism in traction unit 4 for lifting frame 8 from a first generally horizontal position to an upper raised position (not shown). Frame 8 is placed into the upper raised position whenever traction unit 4 is driven relatively long distances and is not operating to cut vegetation.

Lift arms 20 and 22 terminate at their forward edges in cylindrical vertically extending sleeves 24. Each of the sleeves 24 supports an upwardly extending spindle 25 of a caster wheel 26 (see FIG. 1). Suitable reinforcing crossbars 28 may be used between lift arms 20 and 22 and front bar 23 as necessary. Preferably, all the components of frame 8 are rigidly secured together, as by welding or the like.

THE CUTTING UNIT

Referring both to FIGS. 1 and 2, cutting unit 6 comprises a transversely elongated housing 30 having a longitudinal centerline 32. Centerline 32 extends in the direction of forward movement of traction unit 4. Housing 30 of cutting unit 6 includes a downwardly opening cutting chamber 34. A plurality of rotatable rigid cutting blades 36 are mounted in cutting chamber 34. Blades 36 are received on drive spindles which extend downwardly through suitable openings 38 in the top of housing 30. Blades 36 both cut the vegetation underneath cutting unit 6 and direct the cut particles outwardly through a side discharge chute 37. While rigid cutting blades have been disclosed, any suitable means for cutting the vegetation could be used in cutting chamber 34.

Cutting unit 6 further includes a means for engaging the ground which is located between caster wheels 26 on frame 8. More particularly, as shown in FIG. 2 this ground engaging means comprises a plurality of anti-scalping rollers 39 on the front side of cutting unit 6 closely adjacent either side of longitudinal centerline 32. Additional anti-scalping rollers (not shown) may be located on the underside of cutting unit 6 spaced at various points therearound. When cutting unit 6 is suspended from frame 8, the anti-scalping rollers 39 are preferably located above the level of the ground. The purpose of rollers 39 will be described hereafter.

THE CUTTING UNIT SUSPENSION MEANS

The improved means for suspending cutting unit 6 from frame 8 includes four suspension units 40, 41, 42 and 43 extending between and suspending cutting unit 6 from frame 8. Suspension units 40 and 41 are generally identical and are located adjacent the rear side of cutting unit 30. They may be referred to as rear suspension units 40 and 41. Similarly, suspension units 42 and 43 are generally identical and are located adjacent the front side of cutting unit 30. Thus, they may be referred to as front suspension units 42 and 43. The suspension units in each pair are spaced on either side of the longitudinal centerline 32 of cutting unit 6.

Suspension units 40-43 include an upwardly opening saddle member 44 that includes a vertical slot 46. Vertical slot 46 is elongated and defines an open vertical height for the saddle member 44. This height will be referred to as 45. In addition, the front suspension units 42 and 43 are longitudinally elongated, i.e. elongated in the direction of the longitudinal centerline 32 of cutting unit 6. Thus, the slots 46 of front suspension units 42 and 43 have a substantial length 47.

Rear suspension units 40 and 41 are not longitudinally elongated in the same manner as front suspension units 42 and 43. Rather, the rear suspension units 40 and 41 include an upwardly extending vertical wall 48. Wall 48 divides the saddle members 44 of these suspension units into two substantially identical slots 46 located one behind the other. The slots 46 of rear suspension units 40 and 41 have a much narrower length 49 than the length 47 of the slots 46 of the front suspension units 42 and 43. This is for a purpose to be described hereafter.

Each of the suspension units 40-43 also includes a suspension member 50 carried on cutting unit 6. Suspension member 50 preferably comprises an elongated cylindrical pin 51. Each suspension unit 40-43 also includes two opposed upwardly extending brackets 52. Brackets 52 include sets of vertically spaced holes 53 arranged in front and rear rows 54 and 55. The brackets 52 of the front and rear suspension units on either side of the centerline 32 may be connected together by a longitudinal reinforcing rod 56.

Brackets 52 in each of the suspension units 40–43 are spaced apart sufficiently far to allow one of the saddle members 44 to be received therebetween. A pin 51 is received through one set of aligned holes 53 in the brackets and is secured to brackets 52 by any suitable securing member 58, such as a cotter pin. When pin 51 is received in one set of holes 53, it is also received inside the open height 45 of vertical slot 46 of the saddle member 44 received between brackets 52. In effect, cutting unit 6 hangs from the frame 8 at each of the suspension points defined by one of the suspension units 40–43 with the pins 51 resting in the bottom of slots 46 of each saddle member. However, cutting unit 6 is free to move vertically upwardly at each of these points simply by upward movement of pin 51 in the slot 46.

The suspension pins 51 in the front suspension units 42 and 43 are not longitudinally constrained in their corresponding saddle members 44 since the slots 46 are longitudinally elongated. However, the pins 51 of the rear suspension units 40 and 41 are longitudinally captured in one of the slots 46 defined by vertical wall 48 depending on which row 54 or 55 of the holes 53 the pin 51 is received in. In other words, the length 49 of slots 46 in the rear suspension units 40 and 41 is chosen to be slightly larger than the diameter of pins 51 to receive pins 51 in a relatively close fit. This longitudinally couples cutting unit 6 to frame 8 so that the drive of the frame will be transmitted to the cutting unit 6 to propel the cutting unit forwardly or rearwardly.

Referring now to FIG. 1, traction unit 4 includes a set of spaced apart opposed brackets 62 overlying the middle of cutting unit 6. A tension spring 63 has one end affixed to cutting unit 6 and the other end received on a pin 64. Pin 64 is received in one set of vertically spaced holes 66 in brackets 62. Spring 63 serves to counterweight the weight of cutting unit 6. The spring tension may be adjusted by placing pin 64 in different vertical sets of the holes 66. The spring tension should be adjusted until the cutting unit 6 can move upwardly relative to frame 8 relatively easily, i.e. with relatively small amounts of upward force, while still allowing the weight of cutting unit 6 to hold the cutting unit 6 down relative to the frame 8 during a normal cutting operation.

OPERATION

In the operation of riding mower 2, cutting unit 6 is suspended from the frame 8 above the ground surface by suspension units 40–43. The ground surface is indicated as A in FIGS. 3 and 4. Caster wheels 26 on frame 8 roll along ground surface A with the anti-scalping rollers 39 on cutting unit 6 being located slightly above ground surface A. The cutting blades 36 on cutting unit 6 will be rotated to cut the vegetation and thrust the cut particles out through grass discharge chute 37.

Figure 3:
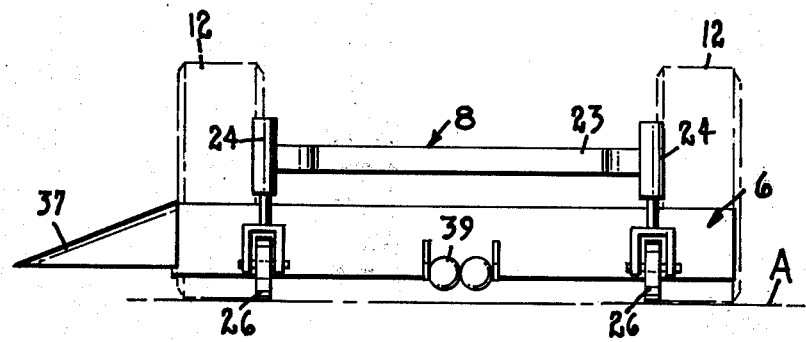
FIG. 3 is a front elevational schematic view of the riding mower shown in FIG. 1, particularly illustrating the attitude of the cutting unit relative to the frame of the traction unit during a cutting operation over a relatively flat ground surface.

FIG. 3 illustrates operation of riding mower 2 over a relatively level ground surface A. For such an orientation, cutting unit 6 is suspended relatively horizontal and above the ground surface. It, however, the ground contour should change significantly from one side of riding mower 2 to the other in a relatively uniform manner, as when following a contour along the side of a hill, caster wheels 26 will sense the change. Wheels 26 will accomodate that change by following the ground contour and tilting frame 8 which also tilts cutting unit 6. However, in this type of tilting action, cutting unit 6 does not tilt relative to frame 8.

Figure 4:
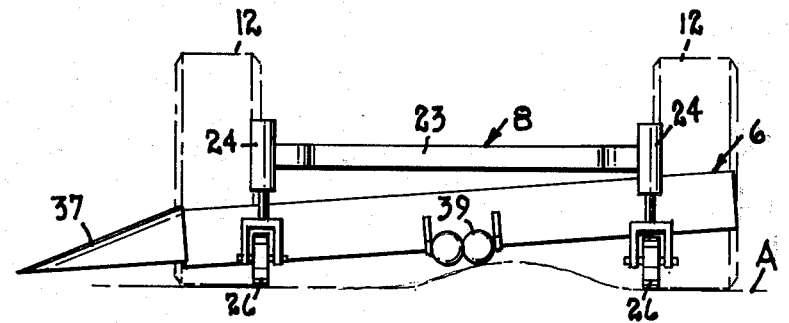
FIG. 4 is a front elevational schematic view similar to that shown in FIG. 3, particularly illustrating the attitude of the cutting unit relative to the frame of the traction unit when a change in ground contour occurs between the caster wheels of the traction unit.

FIG. 4 illustrates a situation where the ground contour changes only at a location between the caster wheels, i.e. at a bump or the like in the ground. Such a change in ground contour would not be sensed by caster wheels 26. However, the anti-scalping rollers 39 on cutting unit 6 sense the change in ground contour. Rollers 39 are able to tilt cutting unit 6 relative to frame 8 as shown in FIG. 4 to prevent scalping of the ground. Such a tilting action is allowed since cutting unit 6 is suspended from frame 8 and can move upwardly relative to frame 8 at each of the suspension points.

Riding mower 2 according to this invention has superior anti-scalping properties since cutting unit 6 is able to tilt side-to-side relative to frame 8. Such an action is allowed utilized suspension units 40–43 which are relatively simple and inexpensive. Thus, riding mower 2 is superior to similar units in the prior art utilizing universal joints or the like to accomplish the same floating action.

Various modifications of this invention will be apparent to those skilled in the art. For example, cutting unit 6 could be suspended from frame 8 by more or less than four suspension units as long as the suspension units are similar to those disclosed herein and as long as at least some of these suspension units are longitudinally coupled to frame 8 for movement therewith in the manner illustrated for the rear suspension units 40 and 41. In addition to side-to-side tilting of cutting unit 6 relative to frame 8, cutting unit 6 also exhibits good tilting properties from front to rear and diagonally from one corner to an opposite corner. This allows cutting unit 6 to float as necessary in going over curbs and the like and for other changes in ground contour. Such tilting is allowed by virture of the fact that cutting unit 6 is suspended from frame 8 by four suspension units in the manner of strings or the like.

Accordingly, the scope of this invention is to be limited only by the appended claims.

We claim:

1. A vegetation cutting apparatus, which comprises:
   (a) a base unit which is movable over the ground in a longitudinal direction;
   (b) a cutting unit having means for cutting vegetation; and
   (c) means for mounting the cutting unit on the base unit, wherein the mounting means comprises means for suspending the cutting unit from the base unit on at least two laterally spaced suspension points with the cutting unit free to move upwardly at each suspension point to allow the cutting unit to tilt side-to-side laterally relative to the base unit, wherein the suspending means comprises a suspension unit at each of the suspension points, wherein each suspension unit comprises a suspension member carried on the cutting unit which is received in an elongated vertical slot on the base unit to allow upward vertical movement of the cutting unit relative to the base unit at each of the suspension points, and wherein at least one of the suspension members on the base unit is also continuously longitudinally constrained in the vertical slot on the base unit to longitudinally couple the cutting unit to the base unit for movement therewith.

2. A self-propelled riding mower, which comprises:
   (a) a traction unit suited for movement over the ground;
   (b) a cutting unit having means for cutting vegetation; and (c) means for mounting the cutting unit on the traction unit, wherein the mounting means comprises:
  (i) frame means extending outwardly from the traction unit; and
  (ii) means for suspending the cutting unit from the frame means on at least three suspension points defining a plane with the cutting unit free to move upwardly at each of the suspension points independently of the frame means and independently of whether the frame means also moves upwardly at the other suspension points to allow the cutting unit to free float and tilt side-to-side relative to the frame means, and wherein the suspending means comprises a suspension unit at each of the suspension points, wherein each suspension unit comprises an upwardly opening saddle member carried on the frame means having a pre-determined open vertical height; a pin carried on the cutting unit wherein the pin is received in the saddle member and is free to move upwardly throughout the height of the saddle member, and wherein the open vertical height of the saddle member is at least twice the diameter of the pin to allow substantial vertical movement therein.

3. A self-propelled riding mower as recited in claim 2, further including means for longitudinally fixing at least some of the pins to the saddle members in which they are received to longitudinally secure the cutting unit relative to the frame means so that the cutting unit is propelled by the traction unit.

4. A self-propelled riding mower as recited in claim 3, wherein the saddle members to which the pins are longitudinally fixed include a vertical slot in which the pins are received, wherein the slots are sufficiently vertically elongated to allow vertical movement of the pins therein and are sufficiently narrow to longitudinally constrain the pins therebetween for longitudinally securing the cutting unit to the frame means.

5. A self-propelled riding mower as recited in claim 2 or 4, further including means for vertically adjusting the pins on the cutting unit for changing the height of cut of the cutting unit relative to the frame means when the pins are received in the saddle members.

6. A self-propelled riding mower as recited in claim 2, wherein the frame means includes two ground-engaging caster wheels located in front of the cutting unit and spaced to either side of a longitudinal center line of the cutting unit for rollably supporting the frame means on the ground.

7. A self-propelled riding mower as recited in claim 6, further including means on the cutting unit for engaging the ground, wherein the ground engaging means is located between the caster wheels on the frame means for causing the cutting unit to move upwardly in response to a change in ground contour which occurs between the caster wheels.

8. A self-propelled riding mower as recited in claim 7, wherein the ground engaging means on the cutting unit comprises at least one ground engaging roller mounted approximately on or closely adjacent the longitudinal center line of the cutting unit.

* * * * *

REEXAMINATION CERTIFICATE (952nd)
United States Patent [19]
Witt et al.

[11] B1 4,325,211

[45] Certificate Issued Nov. 29, 1988

[54] FLOATING DECK FOR RIDER MOWER

[75] Inventors: Robert H. Witt, Bloomington; Walter J. Petersen, Eden Prairie, both of Minn.

[73] Assignee: The Toro Company, Minneapolis, Minn.

Reexamination Request:
No. 90/001,515, May 23, 1988

Reexamination Certificate for:
Patent No.: 4,325,211
Issued: Apr. 20, 1982
Appl. No.: 183,293
Filed: Sep. 2, 1980

[51] Int. Cl.$^4$ .................. A01D 34/66; A01D 34/74
[52] U.S. Cl. ............................. 56/15.8; 56/DIG. 22
[58] Field of Search ...................... 56/15.8, DIG. 22

[56] References Cited
U.S. PATENT DOCUMENTS

| | | | |
|---|---|---|---|
| 2,801,510 | 8/1957 | Colburn | 56/DIG. 22 |
| 3,255,577 | 6/1966 | Colburn | 56/DIG. 22 |
| 3,375,645 | 4/1968 | Miller | 56/15.8 |
| 3,461,654 | 8/1969 | Plamper | 56/15.3 |
| 3,522,694 | 8/1970 | Horn | 56/DIG. 22 |
| 3,706,188 | 12/1972 | Quiram | 56/15.8 |
| 3,795,094 | 3/1974 | Mollen et al. | 56/15.8 |
| 4,310,997 | 1/1982 | Streicher | 56/DIG. 22 |
| 4,313,295 | 2/1982 | Hansen et al. | 56/DIG. 22 |
| 4,321,783 | 3/1982 | Kawasaki et al. | 56/DIG. 22 |

OTHER PUBLICATIONS

Sears 10 H.P. Varidrive, 36" Riding, Electric Start Lawn Tractor, Model No. 917.255350, pp. 12 and 29.
MTD Products Inc. Operating/Service Instructions, Model Nos. 133–440 Recoil, 133–445 Electric, 1973, cover and page 13.
MTD Products Inc. Operating/Service Instructions, Model Nos. 133–460 Recoil, 133–465 Electric, 1973, cover and p. 14.
MTD Products Inc. Owner's Operating Service Instruction Manual, Model Nos. 134–440A, 134–445A, 1974, cover and additional page.
MTD Products Inc. Owner'Operating Service Instruction Manual, Model Nos. 134–460A, 134–465A, 1974, cover and p. 22.
MTD Products Inc. Owner's Operating Service Instruction Manual, Model Nos. 135–460A, 135–465A, 1975, cover and p. 24.

Primary Examiner—Paul J. Hirsch

[57] ABSTRACT

A riding mower (2) includes a cutting unit (6) suspended from a traction unit (4). Cutting unit (6) is suspended from a forwardly extending frame (8) by four suspension units (40–43). Each suspension unit includes an upwardly opening saddle member (44) in which a pin (51) carried on cutting unit (6) is received. At least some of the pins (51) are longitudinally constrained in the saddle members (44) to longitudinally couple cutting unit (6) to frame (8). This allows cutting unit (6) to move upwardly relative to frame (8) at each of the suspension units to allow the cutting unit (6) to tilt or float relative to frame (8).

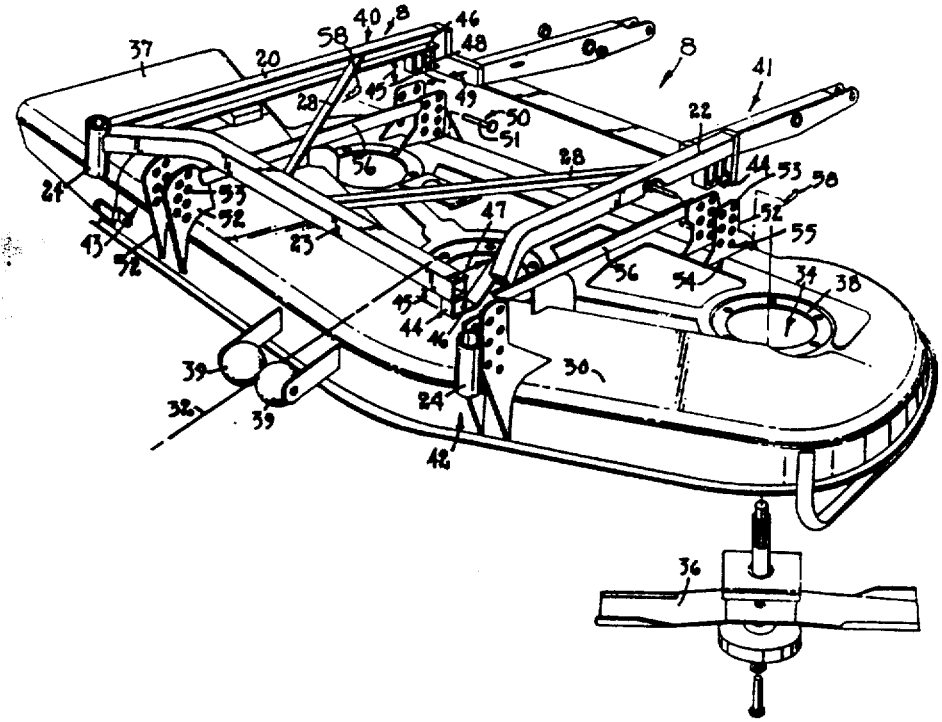

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3–5 are cancelled.

Claim 2 is determined to be patentable as amended.

Claims 6–8 dependent on an amended claim, are determined to be patentable.

2. A self-propelled riding mower, which comprises:
(a) a traction unit suited for movement over the ground;
(b) a cutting unit having means for cutting vegetation; and
(c) means for mounting the cutting unit on the traction unit, wherein the mounting means comprises:
(i) frame means extending outwardly from the traction unit; and
(ii) means for suspending the cutting unit from the frame means on at least three suspension points defining a plane with the cutting unit free to move upwardly at each of the suspension points independently of the frame means and independently of whether the frame means also moves upwardly at the other suspension points to allow the cutting unit to free float and tilt side-to-side relative to the frame means, and wherein the suspending means comprises a suspension unit at each of the suspension points, wherein each suspension unit comprises an upwardly opening saddle member carried on the frame means having a pre-determined open vertical height; *and* a pin carried on the cutting unit wherein the pin is received in the saddle member and is free to move upwardly throughout the height of the saddle member, and wherein the open vertical height of the saddle member is at least twice the diameter of the pin to allow substantial vertical movement therein. *further including means for longitudinally fixing at least some of the pins to the saddle members in which they are received to longitudinally secure the cutting unit relative to the frame means so that the cutting unit is propelled by the traction unit, and further including means for vertically adjusting the pins on the cutting unit for changing the height of cut of the cutting unit relative to the frame means when the pins are received in the saddle members, wherein the saddle members to which the pins are longitudinally fixed include a vertical slot in which the pins are received, wherein the slots are sufficiently vertically elongated to allow vertical movement of the pins therein and are sufficiently narrow to longitudinally constrain the pins therebetween for longitudinally securing the cutting unit to the frame means.*

* * * * *